United States Patent [19]

Grego et al.

[11] Patent Number: 5,305,077
[45] Date of Patent: Apr. 19, 1994

US005305077A

[54] HIGH-RESOLUTION SPECTROSCOPY SYSTEM

[75] Inventors: Giorgio Grego, Venaria; Luigi Tallone, Paesana, both of Italy

[73] Assignee: CSELT-Centro Studi E Laboratori Telecommunicazioni S.p.A., Torino, Italy

[21] Appl. No.: 859,822

[22] Filed: Mar. 30, 1992

[30] Foreign Application Priority Data

Jun. 28, 1991 [IT] Italy .................. 91 A 000492

[51] Int. Cl.⁵ .................................. G01B 9/02
[52] U.S. Cl. ........................ 356/346; 356/352
[58] Field of Search ............ 356/345, 346, 301, 352

[56] References Cited

U.S. PATENT DOCUMENTS 4,008,961 2/1977 Barrett et al. ............... 356/301
5,059,026 10/1991 Zoechbauer ................. 356/346

FOREIGN PATENT DOCUMENTS

PCT/GB89/-
01532 6/1990 PCT Int'l Appl. .
1530547 11/1978 United Kingdom .
1583992 2/1981 United Kingdom .

OTHER PUBLICATIONS

The Accuracy of Laser Wavelength Meters, R. Castell et al. 2318B Applied Physics B. Photophysics, No. 1, Berlin, Germany.
Applied Optics, vol. 25, No. 24, Dec. 15, 1986, p. 4520 Jennings et al.
8127 Review of Scientific Instruments, No. 9, Woodbury, N.Y. Sep. 1985.

Primary Examiner—Samuel A. Turner
Assistant Examiner—Robert Kim
Attorney, Agent, or Firm—Herbert Dueno

[57] ABSTRACT

The radiation to be analyzed is sent onto an interference filter which selects different portions of the radiation spectrum in correspondence with different incidence angles. The intensity values of the radiation outgoing from the element are stored by a measuring and data processing unit which processes such values with the transfer function of the element to obtain the information on the spectrum.

5 Claims, 1 Drawing Sheet

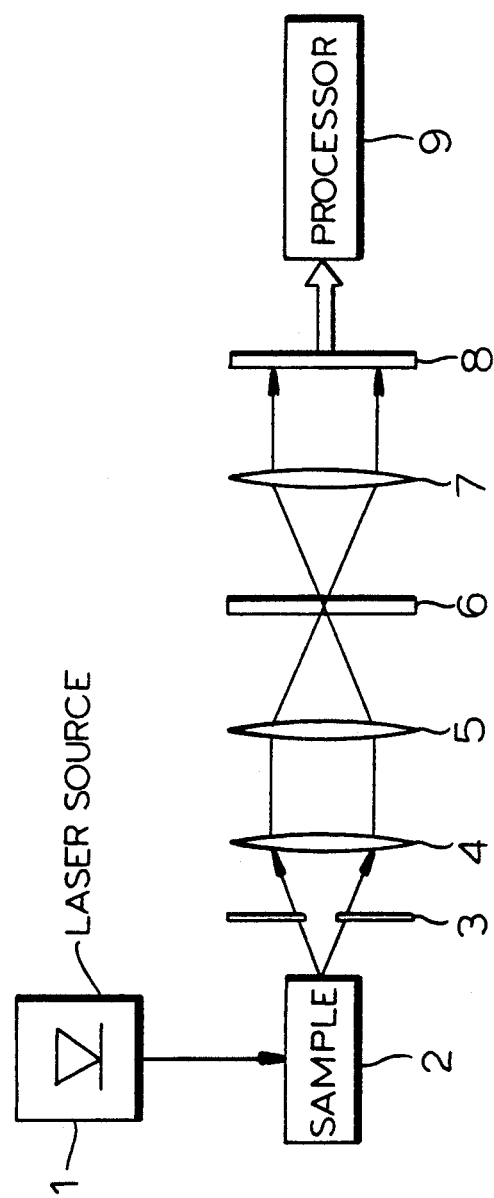

HIGH-RESOLUTION SPECTROSCOPY SYSTEM

FIELD OF THE INVENTION

Our present invention relates to optical spectroscopy systems and, more particularly, to a high-resolution spectroscopy system.

BACKGROUND OF THE INVENTION

Optical spectroscopy systems commonly used to analyze the spectrum of a light radiation generally utilize prisms or gratings which give rise to a spatial dispersion of the various wavelengths present in the radiation to be analyzed. In certain applications very high resolutions are required in order to separate wavelengths which differ e.g. by some nanometers as may be necessary to characterize a monochromatic or quasi-monochromatic source (namely an LED or a laser diode), or in Raman or Brillouin spectroscopy.

Obtaining such high resolutions by spatially dispersive means with satisfactory results demands use of very cumbersome, complicated and expensive systems. To overcome this problem, spectroscopy systems have been proposed which exploit different means for the selection of the frequency range of interest, such as for instance interference filters.

Interference filters, as is known, consist of a transparent dielectric substrate, with a suitable refractive index, onto which a complex multilayer coating has been deposited. Light radiation traversing the filter undergoes multiple reflections at the interfaces between the various layers. By an appropriate choice of the refractive indices and thicknesses of the layers, a certain portion of the incident radiation spectrum can be transmitted or eliminated by interference. The cut-off wavelength (in case of high-pass or low-pass filters), or the central wavelength of the transmitted or eliminated band (in case of bandpass or band-elimination filters) varies with the incidence angle, since the optical paths of the various rays inside the filter change.

An example of system using an interference filter is described in WO-A-90/07108 published on Jun. 28, 1990.

That document discloses a Raman spectroscopy apparatus where a sample is illuminated by light from a laser source, which is reflected to it by a dichroic mirror, and a bidimensional image of the illuminated area is formed on a detector through a suitable optical system. On the way to the detector, the light passes through an interference filter which selects a desired line from a Raman spectrum scattered by the sample. The filter is arranged for pivotal movement about an axis perpendicular to the optical axis, to scan in wavelength the scattered spectrum.

For each position of the filter, the rays or beams which give rise to the image traverse the interference filter at different angles. Hence the image is a non-monochromatic image of the sample, and each point on the detector will be associated with a point of the sample and a wavelength. A computer measures the frequencies and the relative intensities of the peaks present in the signals supplied by the various detector points and associates the results with the spectra of the various molecules. The same computer can control the filter movements.

The known system has a number of drawbacks which limit its performance. More particularly, the interference filter is used basically as a monochromator, and hence its resolution is strictly dependent on the width of the filter passband. To obtain good resolution not only must the band must be very narrow, but the corresponding peak must also be isolated from adjacent secondary peaks, if any. It is rather complicated and hence expensive to fabricate interference filters meeting these requirements. Besides, the resolution also depends on the accuracy with which the amplitude of the filter angular displacements filter can be determined. Since the cost of angular position measuring devices increases with sensitivity, also such requirement causes an increase in the system costs. Finally the presence of moving parts generally gives rise to reliability problems.

SUMMARY OF THE INVENTION

In accordance with the invention a spectroscopy system based on the use of interference filters is provided, which allows high resolution and high sensitivity to be achieved without particular filter band requirements and without exploiting filter movement to obtain wavelength scanning.

A system in accordance with the invention comprises a source of the radiation to be analyzed, means for the photoelectric conversion of said radiation, an interference filter arranged between the source and the photoelectric conversion means to select different wavelength intervals in the radiation emitted by the source, and a measuring and data processing device connected to the conversion means, which memorizes the intensity values of the output signals of the conversion means as the selected wavelength interval varies and obtains the information on the spectrum from the signals. According to the invention the interference filter is associated with a first optical system focusing the radiation to be analyzed on such a filter, and with a second optical system collimating the radiation outgoing from the filter and sending the radiation portions outgoing from the filter at different angles to different points of a detection plane, where the photoelectric conversion means is arranged. The measuring and data processing device is designed to obtain the spectral density values at the various wavelengths from the intensity values of the signals outgoing from the conversion means and from the transfer function of the interference filter.

The interference filter must have such a transmittance spectrum that high frequency coefficients of the spectrum Fourier transform are high. Preferably the filter is a filter with very steep transitions from transmittance maxima to minima.

BRIEF DESCRIPTION OF THE INVENTION

The invention will be now described with reference to the annexed drawing, the sole FIGURE of which is a diagram of an embodiment of the invention, applied to material analysis.

SPECIFIC DESCRIPTION

In the drawing, double lines denote the electrical signal paths.

The light emitted by a source 1, e.g. a laser, is sent onto a sample 2 of the material to be analyzed, possibly through a suitable optical system, not shown. The light scattered by sample 2 is partly collected by an optical system, schematically represented by pin-hole diaphragm 3 and lenses 4, 5, and focused on an interference filter 6. The beam outgoing from the filter is then collimated by an optical system 7 and sent towards a detector 8, which either comprises an array of sensitive elements, or is a single element scanning the beam. The different rays of the focused beam impinge on the filter at different angles and for each angle the filter is tuned to a different wavelength. The different sensitive elements of the array (or the single photodetector in its different positions) will then receive radiation comprising correspondingly different wavelength intervals. The output signal of detector 8 is sent to a measuring and data processing system 9, which memorizes the intensity values as a function of the detector position or of the arrival position of the various rays of the radiation on the detector and carries out the processing necessary to obtain the spectral characteristics of the radiation scattered by the sample from the values obtained and from the filter characteristics, memorized inside it.

The filter used is preferably a bandpass or band-elimination filter, of a type whose transmittance characteristics, apart from the wavelength shift of the passband or the eliminated band, remain basically unchanged as the incidence angle of the radiation varies. This simplifies signal processing, as will be better seen hereinafter. The filter need not have a very narrow band, with a single peak, but it can present a spectrum of any shape, provided the transitions from the transmittance maxima to the minima (meaning by minimum the fraction of the peak value which is taken into account to define the filter band limits) are very steep, i.e. the band widening in transition regions is very small. In this way the Fourier transform of the filter transmittance spectrum has a high content at high frequencies, as is important for the completeness of the spectral information obtained, as will be better understood hereinafter. The actual values of the filter bandwidth and of the transmitted wavelengths will be obviously chosen depending on the applications.

By way of example, for Raman spectroscopy measurements, a bandpass filter can be used, with a passband of some tens of nanometers (e.g. 80 nm) and widening of about 1.5% from the peak value to a value equal to one hundredth the peak value. Filters with those characteristics are commercially available and relatively cheap.

Processing of the photodetector output signal by taking into account the filter transfer function is necessary since the signal corresponding to any incidence angle always comprises a contribution from a certain wavelength range, owing to filter bandwidth. More particularly, taking into account the simplest case in which incidence angle variation solely causes a shift of the central wavelength of the passband and indicating by:

$f(\lambda)$ the spectrum to be determined ($\lambda$=wavelength);
$\lambda_0$ the central wavelength of filter 6;
$g(\lambda - \lambda_0)$ the filter transfer function,
the signal outgoing from the detector will be $$h(\lambda_0) = \int_{\lambda_1}^{\lambda_2} f(\lambda) \cdot g(\lambda - \lambda_0) \tag{1}$$

where $\lambda_1$, $\lambda_2$ are the extreme wavelengths of the spectral interval of interest.

The only unknown quantity in equation (1) is $f(\lambda)$, since $h(\lambda_0)$ is measured with the apparatus described and $g(\lambda - \lambda_0)$ is known since it is communicated by the filter manufacturer or can be experimentally determined. The operations carried out by processing system 9 consist in solving equation (1) with respect to $f(\lambda)$; relation (1) is a normal convolution integral and will be solved e.g. by calculating the Fourier or Laplace transform. Thus relation $$F(\omega) \cdot G(\omega) = H(\omega) \tag{2}$$

is obtained, wherefrom the desired function $f(\lambda)$ can be obtained by solving with respect to F and antitransforming.

The assumption of using a filter where the incidence angle variation solely causes a passband shift is not practically limitative, since filters of this kind are generally commercially available. However, if this constraint is not desired, the only difference with respect to the previous case is that the processing system is to solve the following integral equation $$\int_{\lambda_1}^{\lambda_2} g(\lambda,\theta) \cdot f(\lambda)d\lambda = h(\theta) \tag{3}$$

$\theta$ being the incidence angle.

A system as described allows an easy obtention of high resolution, since a filter with the above mentioned characteristics (considering as the limiting wavelength of the passband at which the transmittance is reduced to 1% the peak value) can separate wavelengths whose difference is of the order of the tenths of nanometer (e.g. 0.15 to 0.5 nm). Still with reference to the use of the invention for Raman spectroscopy and supposing that source 1 emits radiation at a wavelength of about 500 nm, Raman scattering peaks for most materials of interest in glass technology are shifted, with respect to the source line, by an amount ranging between some nanometers and about 20 nanometers. Considering a linear passband shift, with incidence angle, by about 1 nm/degree, for the analysis of such a spectrum the light cone incident on the filter should have an aperture of 10 to 20 degrees. Optical system 7 must be chosen taking into account the size of the available sensors. E.g. if detector 8 is a detector with an array of photosensitive elements, where the elements have as a rule a linear size of the order of 15 $\mu$m, with about one thousand elements per row/column (and hence total linear size not far exceeding 1 cm, so that cumbersome optical systems with high focal lengths are not required) each element collects a total band which basically corresponds to filter sensitivity. No difficulties are encountered also in case of use of a single sensor scanning the output beam. It is to be noted in this respect that linear displacements, such as those necessary to such scanning, can be controlled more easily and with greater precision than angular movements, as required by the filter of the system described in the above mentioned patent application.

Information on the wavelength can be obtained from the measurement results with a precision depending on the performance of processing system 9 and on the precision with which the functions in equation (1) can be approximated. A simple personal computer is sufficient to perform the calculations necessary to obtain resolutions of the order of the tenths of nanometer.

To obtain resolutions of this kind with conventional devices, sophisticated apparatus is required, which is much more expensive than the cost of an interference filter and a personal computer. Moreover, the latter need not be dedicated to the system.

It is also worth noting that, in case a filter with the band characteristics mentioned above is used for Raman spectroscopy measurements, the filter passband is considerably wider than the spectrum portion of interest. For that reason the steepness of the transitions between transmittance maxima and minima is important, rather than the passband width, since this steepness determines the efficiency with which the information relevant to the spectrum under test is obtained from the signals measured. To realize that, it is enough to consider two very narrow peaks spaced by $\Delta\lambda$; if the filter transition region has narrower amplitude than $\Delta\lambda$, the contributions of each peak to the signal measured do not overlap (there is first the contribution of only one of them and then that of both) and hence they are easier to distinguish.

Besides, as mentioned, to obtain spectral information as complete as possible, the Fourier transform of the filter transmittance spectrum must have a high content at high frequencies. Since spectral information of greater interest is represented by high frequency components of the function $f(\lambda)$ of equation (1), their contributions to the measured signals are actually present and high if the condition above is satisfied. This is clear for relation (2), and can be easily seen also for (3), by developing both members in a Fourier series.

Hitherto a single point of the sample has been considered. If a wide area is of interest, the sample is to be scanned with the beam emitted by source 1. The remarks about the control of linear displacements instead of angular displacements are valid also in this case.

Of course, the radiation emitted by source 1 can be directly analyzed, by collecting with diaphragm 3 the beam it emits instead of that scattered by the sample.

We claim:

1. A system for the spectral analysis of light radiation, comprising a source of radiation to be analyzed, means for the photoelectric conversion of said radiation, an interference filter arranged between the source and the photoelectric conversion means for selecting different wavelength intervals in said radiation and separately supplying the conversion means with the radiation portions corresponding to the different wavelength intervals, and a measuring and data processing device, connected to the conversion means, which memorizes intensity values of signals outgoing from the conversion means as the wavelength interval selected changes and yielding spectral information from said signal, the interference filter being associated with a first optical system focusing the radiation to be analyzed onto said filter, and with a second optical system, said second optical system receiving radiation outgoing from the filter at different angles and collimating the radiation outgoing from the filter, thereby sending the radiation portions which were outgoing from the filter at different angles to different points of a detection plane at which the conversion means are located, the measuring and data processing device being arranged to obtain spectral density values relevant to the various wavelengths by processing the intensity values of the signals outgoing from the conversion means with the transfer function of the interference filter.

2. A system as claimed in claim 1 wherein the measuring and data processing device is arranged to obtain spectral density values relevant to the various wavelength values by solving the integral equation $$h(\theta) = \int_{\lambda_1}^{\lambda_2} f(\lambda) \cdot g(\lambda,\theta)d\lambda$$

where
$\theta$ = incidence angle
$\lambda$ = wavelength
$\lambda_1$, $\lambda_2$ = extreme wavelengths of the spectral interval of interest;
$h(\theta)$ = signal outgoing from the conversion means
$f(\lambda)$ = spectrum to be determined and
$g(\lambda, \theta)$ = filter transfer function 3. A system as claimed in claim 2 wherein the interference filter is a filter in which the variation in the incidence angle of the light radiation solely causes a shift of the central wavelength of the passband, and the measuring and data processing device is arranged to obtain spectral density values relevant to the various wavelengths by calculating a Fourier or Laplace transform of the convolution integral $$h(\lambda_0) = \int_{\lambda_1}^{\lambda_2} f(\lambda) \cdot g(\lambda - \lambda_0)d\lambda,$$

where $\lambda_0$ is the central wavelength of the filter passband.

4. A system as claimed in claim 1 wherein the interference filter (6) is a filter with such a transmittance spectrum that the spectrum Fourier transform presents a high content at high frequencies.

5. A system as claimed in claim 4 wherein the interference filter (6) is a filter with very steep transitions between transmittance maxima and minima.

* * * * *